F. GUIDA.
MACHINE FOR COILING WIRE.
APPLICATION FILED OCT. 13, 1916.
1,219,294.
Patented Mar. 13, 1917.
2 SHEETS—SHEET 1.
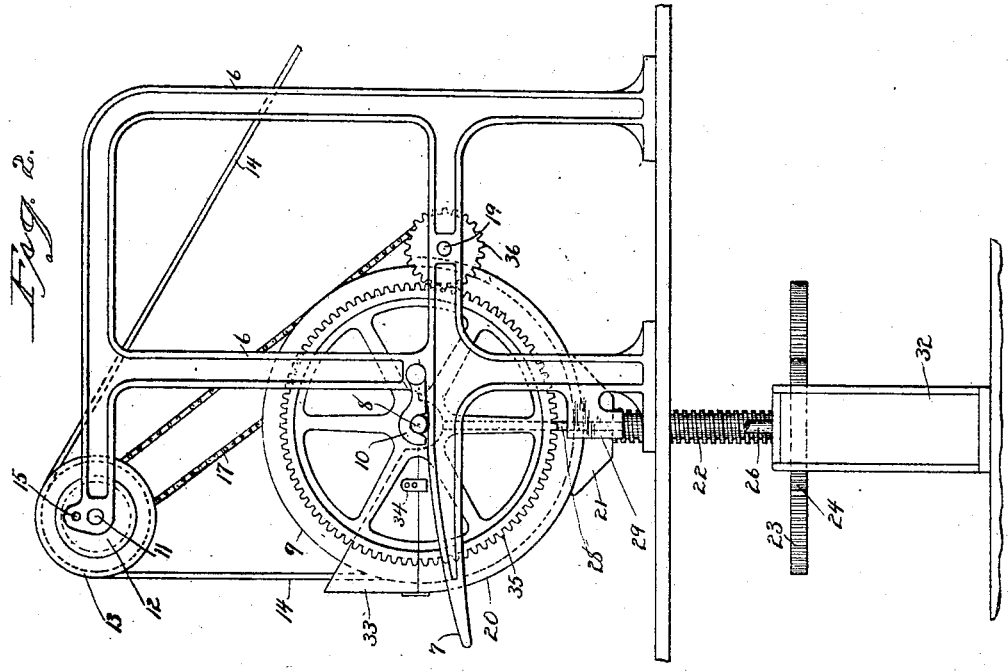
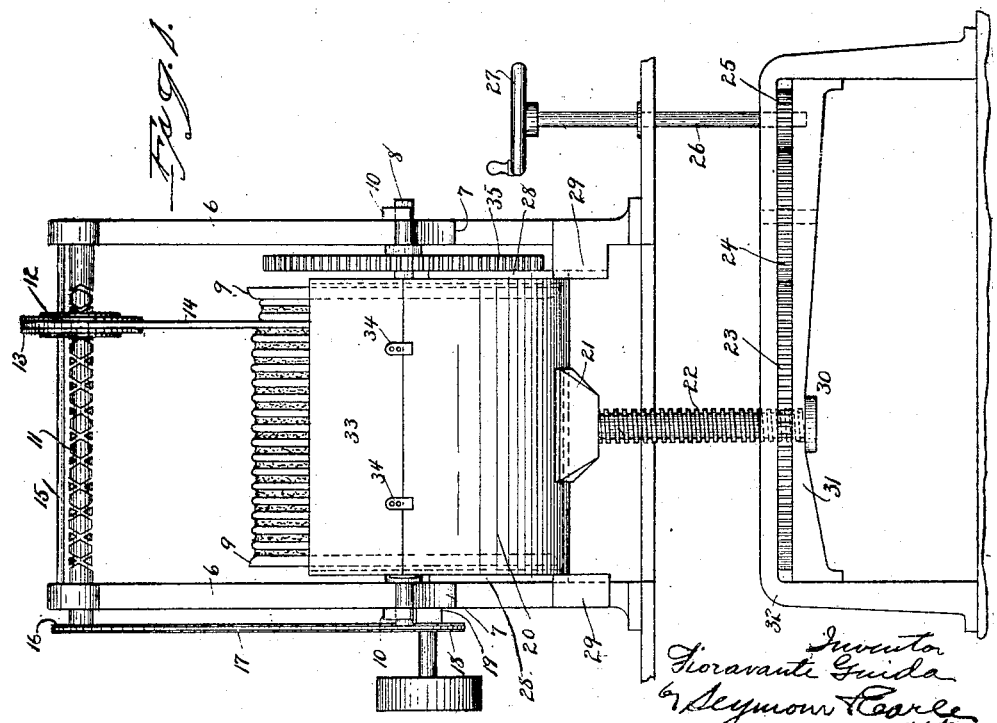

F. GUIDA.
MACHINE FOR COILING WIRE.
APPLICATION FILED OCT. 13, 1916.
1,219,294.
Patented Mar. 13, 1917.
2 SHEETS—SHEET 2.
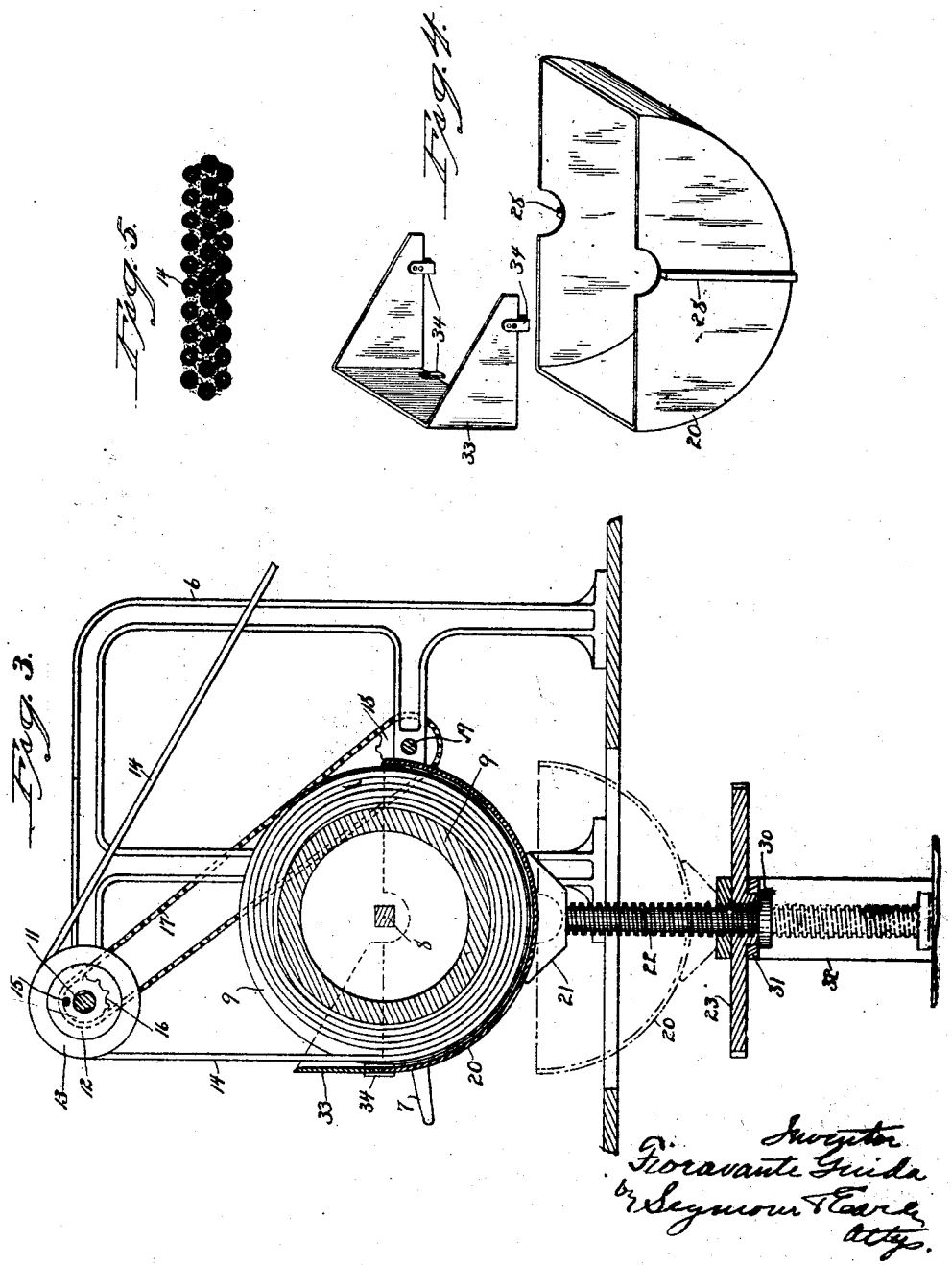

UNITED STATES PATENT OFFICE.

FIORAVANTE GUIDA, OF NEW HAVEN, CONNECTICUT.

MACHINE FOR COILING WIRE.

1,219,294.   Specification of Letters Patent.   Patented Mar. 13, 1917.

Application filed October 13, 1916. Serial No. 125,458.

*To all whom it may concern:*

Be it known that I, FIORAVANTE GUIDA, a citizen of the United States, residing at New Haven, in the county of New Haven and State of Connecticut, have invented a new and useful Improvement in Machines for Coiling Wire; and I do hereby declare the following, when taken in connection with the accompanying drawings and the characters of reference marked thereon, to be a full, clear, and exact description of the same, and which said drawings constitute part of this application, and represent, in—

Figure 1 a front view of a machine for coiling wire constructed in accordance with my invention.

Fig. 2 a side view of the same.

Fig. 3 a vertical sectional view.

Fig. 4 a perspective view of the hopper with the guard detached.

Fig. 5 a diagrammatic view of a section of the coiled wire showing the spaces between the coils filled with powder.

This invention relates to an improvement in machines for coiling wire, and particularly to insulated wire such as is commonly used for electric conductors. This wire is coated or covered in various ways, and after it is covered, it is wound upon a reel and subjected to heat for vulcanizing. As the covering before vulcanizing is comparatively soft, it often happens that flat places are formed in the wire which renders the wire unfit as an electrical conductor. The object of this invention is to provide means for supporting the soft coils of wire as they are wound upon a drum so that after it is vulcanized, the wire will be perfectly round and the insulation uninjured; and the invention consists in the construction hereinafter described and particularly recited in the claims.

In carrying out my invention, I employ a suitable frame 6 formed on opposite sides with inclined runways 7 upon which may rest the ends of a shaft 8 carrying a reel 9 the ends of the shaft being adapted to be engaged and locked with the frame by latches 10. The frame also supports a double threaded guide-screw 11 on which a nut 12 is mounted so as to move from side to side as the guide-screw is turned, and on this nut 12 is a grooved idler 13 over which the freshly insulated wire 14 passes and by which it is guided to the reel 9. The nut 12 is held against turning by passing rod 15 through it, the ends of the rod being supported in the sides of the frame. The guide-screw 11 is provided at one side with a sprocket wheel 16 which is connected by a sprocket chain 17 with a sprocket wheel 18 on a driven shaft 19. On the shaft 8 is fixed a large gear wheel 35 meshing with pinion 36 on the driven shaft 19 so that as the shaft 19 turns, the reel will also be turned to draw the wire over the idler 13. It will be understood that the rate of movement of the reel will be in time with the movement of the guide screw 11 which may be varied by changing the size of the sprocket 16. Below the reel and adapted to inclose the lower portion of it, is a hopper 20 and this hopper rests in a saddle 21 which is mounted upon the upper end of a worm 22 which is adapted to be moved up and down by a worm wheel 23 provided with external gear teeth meshing with a pinion 24 turned by a pinion 25 on the lower end of a post 26 which is provided at its upper end with a hand wheel 27 by which the gears may be conveniently turned. Below the frame and in line with the hopper, the flooring will be cut away to give clearance for the downward movement of the hopper which may be guided in its vertical movement by providing it on opposite sides with ribs 28 moving in grooves formed in lugs 29 on opposite sides of the frame. Preferably and as shown, the worm 22 will be provided at its lower end with a stop-disk 30 which, at the limit of its upward movement, will strike a bridge 31 in a frame 32 which supports the gears 23, 24 and 25. Attached to the upper forward edge of the hopper is a guard 33 provided with downwardly projecting lugs 34 by which it may be secured to the upper edge of the hopper. After the reel has been mounted in the machine, the hopper will be filled with powdered soapstone or other suitable material, and the hopper lifted so that as the reel revolves it will turn in the powder. As the wire is wound upon the reel, the space between the several convolutions of wire will be filled with powder so that the coils are firmly supported and kept out of contact with each other, the powder forming a bed for each layer of wire. After the reel is filled, the hopper will be lowered and the guard 33 removed, after which, after the latches 10 are lifted, the reel can be moved forward over the inclined runways 7 and onto a suitable conveyer for transportation to the vulcanizing or finishing process, and a second reel rolled into place and the hopper raised to its proper position.

If desired, the freshly coated wire may be run through water before passing onto the reel, so that as the wire passes through the mass of powder in the hopper, it will be coated with the powder or pick up enough to form a bed for the succeeding convolution.

I claim:—

1. In a machine for coiling wire, the combination with a frame adapted to support a reel, of a hopper beneath the reel and inclosing the lower portion thereof, and means for raising and lowering said hopper.

2. In a machine for coiling wire, the combination with a frame adapted to support a reel, of a hopper beneath said reel and inclosing the lower portion thereof, a removable guard connected with the upper edge of the hopper, and means for raising and lowering said hopper.

3. In a machine for coiling wire, the combination with a frame provided with inclined runways, of a reel adapted to rest upon said runways, a hopper below said reel and inclosing the lower portion thereof, and means for raising and lowering said hopper.

4. In a machine for coiling wire, the combination with a frame adapted to support a reel, a hopper below said reel and adapted to inclose the lower portion thereof, a vertically arranged worm upon which said hopper rests, and means for turning said worm, whereby said hopper may be raised and lowered.

5. In a machine for coiling wire, the combination with a frame adapted to support a reel, means for turning said reel, a hopper beneath said reel and inclosing the lower portion thereof, a worm upon which the said hopper rests, a vertically arranged post, and a hand wheel at the upper end thereof, and gear connections between the lower end of the post and said worm, whereby the worm may be moved up and down.

In testimony whereof, I have signed this specification in the presence of two subscribing witnesses.

FIORAVANTE GUIDA.

Witnesses:
C. L. WEED,
F. C. EARLE.